United States Patent [19]
Grout et al.

[11] 3,775,063
[45] Nov. 27, 1973

[54] INTERACTIVE SURFACE MIXER

[75] Inventors: Kenneth M. Grout, Topsfield;
Richard D. Devellian, Rockport,
both of Mass.

[73] Assignee: Kenics Corporation, Danvers, Mass.

[22] Filed: Oct. 19, 1970

[21] Appl. No.: 81,869

[52] U.S. Cl................... 23/283, 23/252, 23/288 M,
23/288 R, 261/76, 261/78 A, 261/112,
261/113, 261/108, 48/180 R, 55/92, 138/40,
138/42, 239/402, 195/143
[51] Int. Cl............................................... B01j 1/00
[58] Field of Search............ 23/283, 288 M, 288 R,
23/252, 175; 261/78 A, 76, 112, 113, 108;
48/180 R, 180 B; 259/4; 55/92; 138/40, 41, 42

[56] References Cited
UNITED STATES PATENTS 3,286,992  11/1966  Armeniades et al................... 259/4
3,466,151   9/1969  Sicard et al........................ 23/283 X

*Primary Examiner*—James H. Tayman, Jr.
*Attorney*—Russell & Nields

[57]  ABSTRACT

A device for producing a physical or chemical change of state in a fluid flowing through a conduit which contains a plurality of curved sheet-like elements extending longitudinally through the conduit and in which consecutive elements are curved in opposite directions. The internal surfaces of the conduit and the surfaces of the sheet-like elements are coated with a material which interacts with a component of the fluid to produce such change. The surfaces may be formed of water or other solvents, catalysts, enzymes or other biologically active materials, and the fluid may contain components soluble in such solvents, or the fluid may contain materials upon which such catalysts, enzymes or biologically active materials act to produce the desired change of state.

3 Claims, 5 Drawing Figures

INVENTORS
KENNETH M. GROUT
RICHARD D. DEVELLIAN

BY Russell and Nields

ATTORNEYS

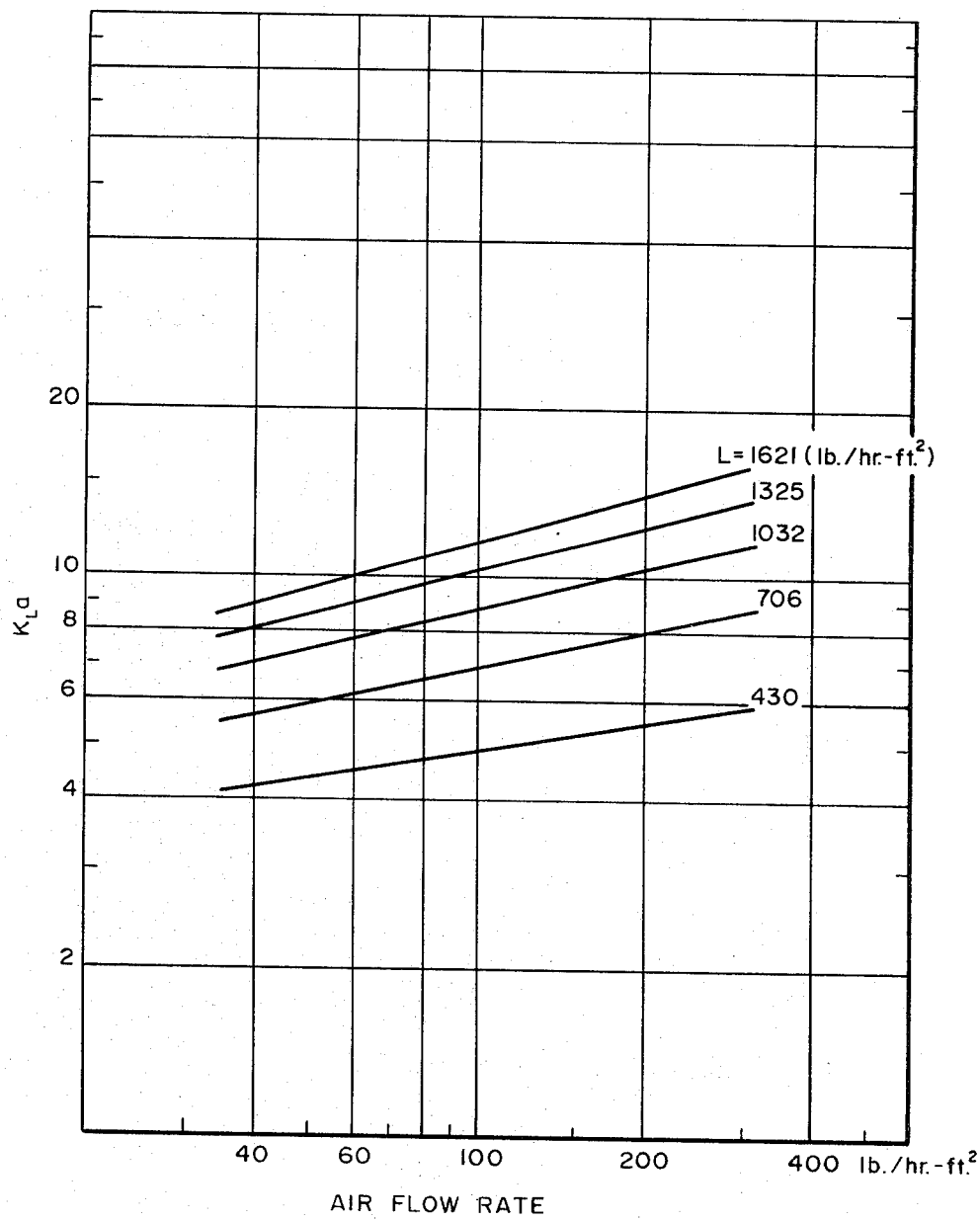
FIG. 4 The Over-all Liquid Phase Absorption Coefficient as a Function of Gas Flow Rate (Packed Bed)

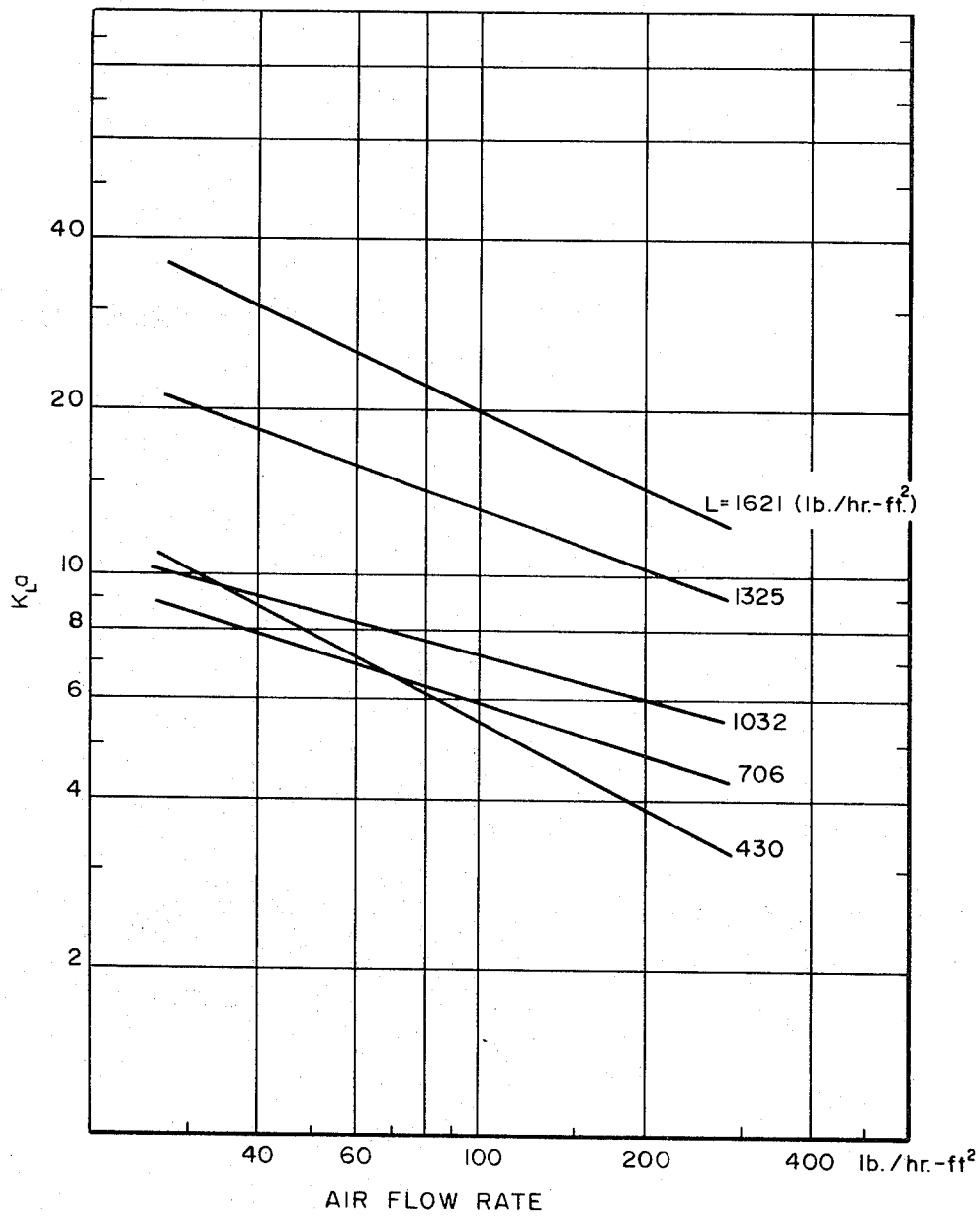
FIG. 5 The Over-all Liquid Phase Absorption Coefficient as a Function of Gas Flow Rate (Invention Mixer)

INTERACTIVE SURFACE MIXER

BACKGROUND OF THE INVENTION

1. Field of the Invention

Mixing devices having surfaces which are interactive with respect to fluids flowing through them.

2. Description of the Prior Art

The prior art has been concerned for many years with the problem of continuously moving large masses of fluid materials through mixing structures so as to add or subtract components to or from said fluid or to produce a physical or chemical reaction between said fluid and other components in such mixers. An example of such a structure is the scrubbing tower which may be of the absorption type in which a soluble component of a gas mixture is dissolved in a liquid, or the stripping tower, in which the inverse operation occurs. The usual types of scrubbing tower for contacting liquid and gas streams have been towers packed with irregular solid packing material such as Raschig rings, Berle saddles or the like; or they have been empty towers into which liquid is sprayed; or towers having various configurations of plates to induce turbulent flow of gas and liquid particles in the towers. Although such devices may be operated with the gas and liquid streams flowing in the same direction, usually they are made to flow counter-currently past each other in order that the greatest rate of absorption may be obtained. Such prior art devices suffer from a number of drawbacks. Because of their complex internal structures, they operate with unduly high pressure drops requiring undesirably high driving power to pump the desired quantities of gas through the system. In addition, counter flow operation is unduly limited since, for a given liquid flow, there is a definite gas flow at which "flooding" occurs. "Flooding" is the condition where the liquid is backed up by the gas and cannot flow through the device. This limits the pounds per hour of gas absorbed in liquid which such devices have been able to achieve. The over-all liquid phase absorption coefficient ($K_L a$) of prior art packed towers has been unduly low at moderate and low gas flow rates and, even at higher gas flow rates, such coefficient has been lower than is desired. Packed towers also tend to be very heavy, and the amount of packing is often limited by the crushing of the packing material at the bottom of the packed bed in the tower. Prior art devices have other drawbacks, including the difficulty and expense of cleaning and maintaining the structures.

SUMMARY OF THE INVENTION

The present invention substantially reduces or eliminates the above limitations and produces advantages heretofore not achieved by utilizing a mixing device which comprises a conduit through which a fluid is caused to flow, the conduit containing a plurality of curved sheet-like elements extending longitudinally within the conduit with successive elements being curved in opposite directions so as to subdivide the fluid body into particulate elements and move them repetitively and positively back and forth across the conduit. The internal surface of the conduit or the surface of each of said sheet-like elements, or both, are comprised of a material which interacts with a component of the fluid to produce a change of state in the fluid. The material may be a solvent such as water, the fluid may be a gas such as air containing $SO_2$ to be dissolved in the water. Other materials such as other solvents, catalysts, enzymes or other biologically or chemically active substances may form such surfaces to interact with appropriate solutes, chemical substances or organic materials to produce the desired change of state.

BRIEF DESCRIPTION OF THE DRAWINGS

In the annexed drawings:

FIG. 4 shows experimental measurements of the over-all liquid phase absorption coefficient as a function of gas flow rate in a prior art device; and FIG. 5 shows corresponding measurements for an embodiment of the present invention.

DETAILED DESCRIPTION OF THE INVENTION

Figure 1:
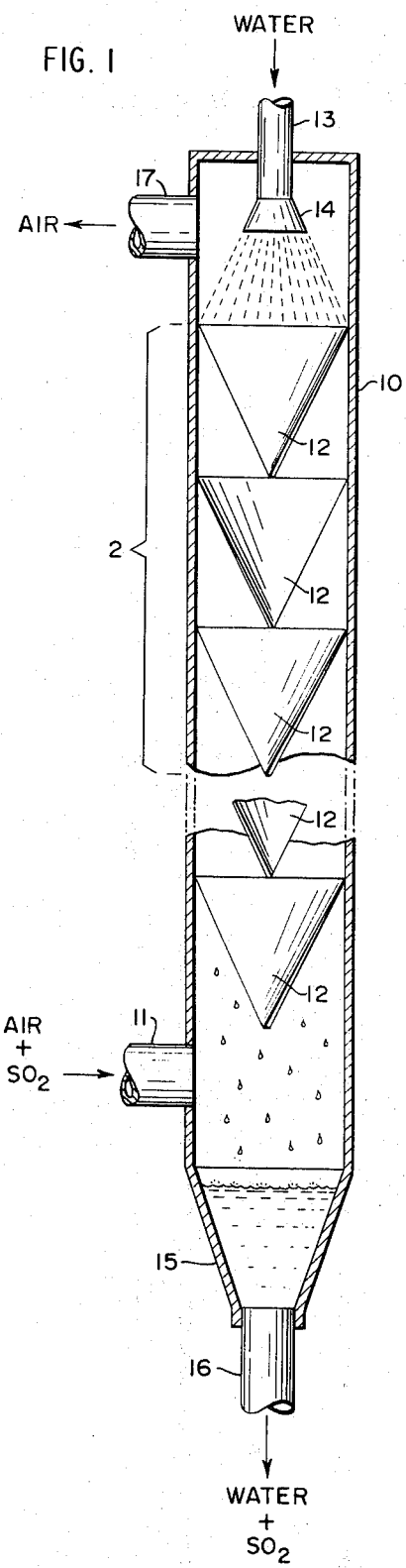
FIG. 1 is a simplified cross-section of a mixing column incorporating one form of the invention.
Figure 2:
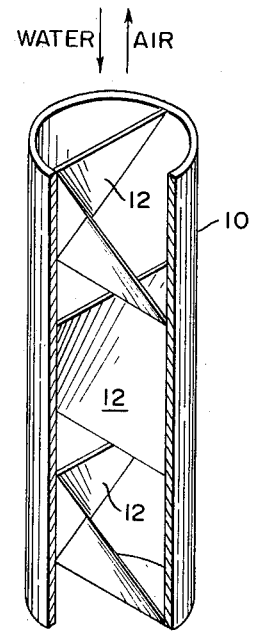
FIG. 2 is a portion of FIG. 1 taken at the bracketed portion 2 and partially broken away to give a perspective view of the interior structure.

In FIGS. 1 and 2, 10 is a hollow column, preferably cylindrical in cross-section, providing a conduit through which a fluid, such as air containing $SO_2$, is caused to flow. Such air may be introduced through an inlet pipe 11 near the bottom of column 10. Within column 10 are disposed a plurality of serially arranged curved elements 12. Only a portion of column 10 is shown in FIG. 1, an intermediate section being omitted, so that it will be understood that any desired number of elements 12 may be present. Each of these elements is constructed of a flat sheet whose width may equal the inner diameter of column 10 and whose length is preferably up to several times its width. Each element is twisted so that its upstream and downstream edges are at a substantial angle to each other. This angle may vary between about 60° and 210°. Also each successive element is twisted in the opposite sense with respect to its preceeding element so that the direction of rotation of the body of air which passes along the elements is reversed for each successive element.

Since, in the embodiment illustrated, it is desired to remove the $SO_2$ from the air, water is introduced at the top of column 10 through a pipe 13 and sprayed through a spray head 14 so that the water coats the internal surfaces of column 10 and the surfaces of elements 12 as it runs down until it drops into a chamber 15 at the bottom of column 10 and is drawn off through a pipe 16. The air, which passes up through the column 10 and is subjected to the action of the elements 12, is exhausted through pipe 17 near the top of column 10.

It has been found that such a structure operates in a fundamentally different manner than in prior art structures. For example, experimental measurements were made on two types of five-foot high, four inch internal diameter, stainless steel column mixers. One type, the results of which are shown in FIG. 4, was packed with two feet of ⅜ inch diameter ceramic raschig rings and the other type, the results of which are shown in FIG. 5, was built in accordance with this invention and was composed of fifteen four inch diameter by four inch long elements. The flow rate of the air stream was varied from 49.6 to 160.8 pounds of air, per hour, per square foot of the transverse cross-sectional area of the column. The water stream mass velocity was varied from 430 to 1,621 pounds of air, per hour, per square foot of such column area. The $SO_2$ concentration of the inlet air varied from 325 to 990 parts per million by volume. Measurements were taken from which the overall liquid phase absorption coefficient $K_La$ was derived for the various conditions of operation of the two types of structures. Such factor is well known in the art and is used as a standard determination of the effectiveness of the mass transfer of $SO_2$ to water or of other mass transfer action in any given device.

The results of the foregoing tests are plotted in FIGS. 4 and 5 in which the horizontal axes represent the air flow rate and the vertical axes represent $K_La$. Each curve plotted is labelled with the water flow rate used.

From FIG. 4 it will be noted that Khd La increases as the air flow rate increases. It is believed that this is due to the fact that the interphase contact between the air and water, which occurs principally at the surfaces of the raschig rings, is a haphazard, random phenomenon which increases with the degree of turbulence of the air flow. Such turbulence increases with the air flow rate and thus results in an increase in $K_La$. Such increased turbulence, however, introduces various difficulties. First of all, it increases the pressure drop through the packed bed and thus requires substantially increased air pumping power. Also such turbulence substantially increases the tendency for flooding to occur so that it imposes an undue limit on the relative flow velocity between the air and water. In other words neither the air flow rate nor water flow rate can be increased to such an extent that values of $K_La$ as high as might be desired can be attained.

When FIG. 5 is analyzed, it will be seen that the present invention operates quite differently from the packed bed structure. In FIG. 5, the values of $K_La$ increase as the air flow rate is decreased, and the values of $K_La$ are substantially higher for moderate and low air flow rates than in the case of the packed bed. It is believed that this is due to the fact that the mixing structure of the present invention operates primarily under conditions of laminar flow and not of turbulent flow. In the present invention, at all values of air flow rate, the air is moved positively and repetitively toward and away from the surfaces of the curved sheets and the inner surfaces of the column. At the same time the angular intersection between successive sheets subdivides the air stream into increasingly smaller portions until such subdivision reaches particulate form. The result is that, in a highly order manner, fresh particles of the air in the streams are brought into positive contact with water surfaces. Mass transfer of $SO_2$ to water takes place along the air-water interface in a highly effective and efficient manner. The lower the air flow rate, with a given water flow rate, the longer will be the contact time between the liquid and gas phases as indicated by the direction of the slopes of the curves in FIG. 5.

Due to the nature of the structure of the invention, the pressure drop through the structure is substantially lower than prior art structures for comparable gas and liquid flow rates. Thus much lower pump power is needed. Again this is believed to be due primarily to the lack of turbulent flow in the invention structure as compared with prior art devices. Also in the invention structure, flooding occurs at a much higher level of relative flow rates between the liquid and the gas. Only at very high relative velocities does the gas flow at the curved sheet surface start to become somewhat turbulent as indicated by the liquid layer starting to become wavy. Thereafter as the relative velocities are increased such surface turbulence increases until hold up of the liquid occurs and flooding ensues. However, this occurs at much higher levels than in prior art structures, the result being that much more liquid can be passed through the same size column in the present device than in prior art devices. Conversely, for the same amount of liquid a smaller column can suffice utilizing the principles of the present invention.

The ability of the invention structures to handle higher quantities of water is of added significance, particularly in considering attainable values of $K_La$ as discussed in connection with FIGS. 4 and 5. As is seen from FIG. 5, increasing rates of water flow result in increasing values of $K_La$ for all rates of air flow and particularly at the lower air flow rates. Additional tests of the invention structure indicate that as the water flow rates are increased above the values shown in FIG. 5, the values of $K_La$ continue to increase. The only limit appears to be that imposed by the flooding level which is far above that of prior art structures. Thus it is possible to attain much higher values of $K_La$ by the present invention than has been possible heretofore.

Figure 3:
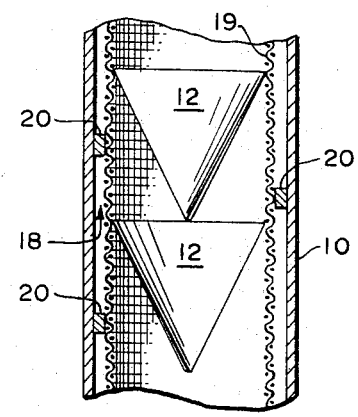
FIG. 3 is a partial cross-sectional view of a modification of the device as shown in FIG. 1.

It should be noted that, in the embodiment described, the area of the internal surfaces of the column 10 is somewhat greater than the area of the surfaces of the curved elements 12. Also the structure insures that each incremental volume of the air will be caused to contact the internal surfaces of column 10 upon flowing past a relatively few elements 12. Thus it is desirable to increase the effectiveness of such internal surfaces. One way in which such enhancement may occur is shown in FIG. 3. In this embodiment, the outside edges of the curved elements 12 are spaced from the inner wall of column 10 to provide a virtually uninterrupted flow path 18 along the inner surfaces of the column 10. In this way increased volumes of water can be flowed along such internal surfaces. In order further to localize such flow a mesh 19 may be supported by spacing studs 20 and thus spaced from the internal surfaces of column 10. In this case the edges of the curved elements 12 may contact the mesh 19 without impeding the flow of water along the inner walls of column 10 while, at the same time increasing the tendency of the curved elements to become thoroughly coated with the flowing water. The mesh 19 affords ready interphase contact between the water flowing adjacent the mesh and the air passing along the curved elements 12.

While it is preferred to coat both the inner surfaces of the column 10 and the surfaces of the curved elements 12 with the active substance such as water, it is also possible to coat either of these surfaces and still obtain a substantial portion of the advantages which this invention offers.

The principles which cause the invention structure to be highly effective in producing mass transfer of $SO_2$ from air to water are also applicable to other embodiments in which a change of state is produced by contacting a flowing fluid with active surfaces. For example, where exhaust gases from furnaces or engines contain carbon monoxide (CO) or one of the oxides of nitrogen, particularly nitrogen dioxide ($NO_2$) or both, it is desirable to change carbon monoxide to carbon dioxide and to reduce the nitrogen oxides back into nitrogen. This may be accomplished, for example, by forming the active surfaces of the invention structure of black copper oxide (CuO) to form a catalyst which causes a reaction between water vapor in such exhaust gases with the carbon monoxide and with the nitrogen oxides to produce the desired result. For this purpose it is desirable to operate the mixing structure at an elevated temperature preferably about 1000°F. or above. Other types of catalytic surfaces to produce a desired chemical reaction between components of a flowing fluid in the invention mixing structure will suggest themselves to those skilled in the art.

As suggested above, where it is desired to produce a biological change in the flowing fluid, the active surfaces could be coated with an enzyme selected to produce the desired action. One such type of action is the reduction of the viscosity of cooked starch by subjecting such starch to the action of an enzyme. Undesirable organic pollutants in water can be broken down into carbon dioxide and water by coating the active surfaces with a biologically active slime. Other examples will suggest themselves to those skilled in the art.

It will be understood that the principles of this invention are applicable to a large number of situations in which fluid-like materials are capable of being flowed through the mixing structures described herein. Such fluid-like materials need not be true fluids and thus the term "fluid" as used herein is intended to encompass gases, liquids, solid particles or any mixtures of such substances as long as they are capable of fluid-like flow. Similarly, since the activity of the internal surfaces of the invention structure may operate in the various modes as described above, the term "interactive" as a characteristic of such surfaces will be used herein to encompass all such modes which produce the desired change of state.

What is claimed is:

1. A mixing structure comprising:
   a. a conduit containing an element consisting of a plurality of sheets connected to each other in series, longitudinally of said conduit, each of said sheets having a helical twist, alternate sheets having helical twists in opposite directions;
   b. positive supporting means connected between said conduit and said element for maintaining said element substantially free of contact with the inner surface of said conduit throughout the length of said conduit with a sufficient spacing between said element and said inner surface to provide a substantially uniform fluid flow passage between said element and said surface; and,
   c. means for flowing a fluid through said fluid flow passage.

2. A structure as in claim 1 in which said positive supporting means comprises a mesh interposed between said inner surface of said conduit and said element.

3. A structure as in claim 2 which also comprises means for flowing a second fluid along said element and in which said mesh provides access of said first named fluid to said second fluid.

* * * * *